US009565192B2

(12) United States Patent
Chillappa et al.

(10) Patent No.: US 9,565,192 B2
(45) Date of Patent: Feb. 7, 2017

(54) ROUTER BASED SECURING OF INTERNET OF THINGS DEVICES ON LOCAL AREA NETWORKS

(71) Applicant: Symantec Corporation, Mountain View, CA (US)

(72) Inventors: Srinivas Chillappa, San Ramon, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 27 days.

(21) Appl. No.: 14/747,896

(22) Filed: Jun. 23, 2015

(65) Prior Publication Data

US 2016/0381030 A1 Dec. 29, 2016

(51) Int. Cl.
*G06F 9/00* (2006.01)
*H04L 29/06* (2006.01)

(52) U.S. Cl.
CPC ......... *H04L 63/102* (2013.01); *H04L 63/0227* (2013.01); *H04L 63/20* (2013.01)

(58) Field of Classification Search
CPC ..... H04L 63/20; H04L 63/102; H04L 63/0227
See application file for complete search history.

(56) References Cited

U.S. PATENT DOCUMENTS

| 9,372,922 B2 * | 6/2016 | Shaashua ................ H04L 43/10 |
| 2012/0197856 A1 | 8/2012 | Banka et al. |
| 2014/0244834 A1 | 8/2014 | Guedalia |
| 2015/0019342 A1 * | 1/2015 | Gupta ................ G06Q 30/0269 705/14.66 |
| 2015/0135277 A1 | 5/2015 | Vij et al. |
| 2016/0149917 A1 * | 5/2016 | Matthieu ................ H04L 63/10 726/4 |

OTHER PUBLICATIONS

International Search Report and Written Opinion for International Application No. PCT/US2016/035571, mailed on Oct. 13, 2016, 17 pages.

\* cited by examiner

*Primary Examiner* — Shewaye Gelagay
*Assistant Examiner* — Khoi Le
(74) *Attorney, Agent, or Firm* — Patent Law Works LLP

(57) ABSTRACT

IoT devices are secured on multiple local area networks. Each local network contains a router which monitors activities of IoT devices, and transmits corresponding information to a backend server. The backend amalgamates this information, calculates dynamic reputation scores, and determines expected authorized activities for specific IoT devices. Based thereon, the backend creates a constraint profile for each IoT device, and transits the constraint profiles to the routers for enforcement. Enforcing a constraint profile can include creating multiples VLANs with varying levels of restricted privileges on a given local area network, and isolating various IoT devices in specific VLANs based on their reputation scores. Constraint profiles can specify to enforce specific firewall rules, and/or to limit an IoT device's communication to specific domains and ports, and/or to specific content. The backend continues to receive monitored information concerning IoT devices from multiple routers over time, and periodically updates constraint profiles.

19 Claims, 3 Drawing Sheets

ROUTER BASED SECURING OF INTERNET OF THINGS DEVICES ON LOCAL AREA NETWORKS

TECHNICAL FIELD

This disclosure pertains generally to computer security, and more specifically to, router based securing of Internet of Things devices on local area networks.

BACKGROUND

The Internet of Things (IoT) refers to a network of physical objects or "things" equipped with computing hardware and software, including the ability to connect to a network and run computer instructions. Household items such as smart thermostats and appliances, as well as sensor-equipped wearable devices, are a few examples of currently popular IoT devices. New IoT devices are rapidly becoming available and adopted by household users. By the year 2017, the average number of connected devices per household is projected to grow to 25 devices, and to 50 devices by the year 2020.

IoT devices are in fact networked computing devices, albeit typically with relatively low amounts storage, memory, power supply and processing capability, and frequently with no display. Another key characteristic that most of these first generation connected IoT devices share is low security. As networked computing devices, IoT devices are vulnerable to malware, network attacks, data theft and the other security threats to which other networked computers are subject.

The manufacturers of these first generation IoT devices (many of which are already on the market) tend to have little or no experience building secure software. Additionally, as time to market of new devices is a priority for manufacturers in this area, security is often neglected. As such, these devices create a number of different potential vulnerabilities. The devices themselves may be subject to compromise, or their behaviors could compromise other systems on the same network. IoT devices often have corresponding cloud services, on which they store information about their customers and the data that they gather. These cloud services can also be insecure. The combination of IoT device vulnerabilities, associated cloud service vulnerabilities, and IoT devices potentially compromising the data they handle and the network on which they are installed is very real and very serious.

The users who are the early adopters of first generation connected devices typically enjoy the convenience of these devices. However, the users tend to be blissfully unaware of the security risk that these devices impose on their network. These devices might be compromising their most sensitive and critical data which would otherwise be more protected behind a firewall. For example, take the case of a cautious user who has been afraid to put scanned copies of his/her tax returns, passport and bank statements in the cloud, and instead stores them locally on a hard drive which is backed up. By adding an IoT device such as a smart thermostat or the like to his/her network, such a user could be opening a direct access vulnerability to this sensitive data.

It would be desirable to address these issues.

SUMMARY

Internet of things (IoT) devices are secured on multiple local area networks. Each local area network contains a router which communicates with a backend server computer. Each router on each local area network monitors activities of one or more IoT device(s), and transmits information concerning monitored activities to the backend server. Thus, the backend server receives information concerning monitored activities of multiple IoT devices on multiple local area networks. The backend server amalgamates information concerning monitored activities of multiple IoT devices received from routers of multiple local area networks over time. Based on this amalgamated information, the backend server calculates dynamic reputation scores quantifying the trustworthiness of specific IoT devices. In addition, the backend server uses the amalgamated information to determine activities which specific IoT devices perform in order to execute authorized functionality. The backend server creates a constraint profile for each specific IoT device, based on its corresponding reputation score and determined activities. A constraint profile comprises local area network level directives specifying how to enable the corresponding IoT device to execute authorized functionality while maintaining local area network level security. When creating constraint profiles, backend or router level analysis of the devices can also be taken into account, such as automatic or human administrator testing of the IoT devices for security vulnerabilities.

Constraint profiles are transmitted by the backend server computer to the routers of the plurality of local area networks, where they are enforced. Enforcing a constraint profile can include, for example, creating a virtual local area network (VLAN) with restricted privileges on the local area network, and isolating the corresponding IoT device in the VLAN. In some embodiments, a plurality of VLANs with varying levels of restricted privileges are created on a given local area network, and various IoT devices are isolated in specific ones of the VLANs based on their reputation scores, such that the privileges of IoT devices with varying reputation scores are subject to varying levels of restriction. Constraint profiles can specify to enforce specific firewall rules, and/or to limit an IoT device's communication to specific domains and ports, and/or to specific content.

The backend server continues to receive monitored information concerning IoT devices from multiple routers on multiple local area networks. Periodically, the backend server calculates updated reputation scores concerning specific IoT devices, and determines updated activities which specific IoT devices perform in order to execute their authorized functionality. Based on this updated information, the backend server periodically updates constraint profiles for specific IoT devices, and transmits the updated constraint profiles to the routers for enforcement.

The routers can discover new IoT devices on their local area networks, for example when a new device is installed or otherwise put in service. When such a discovery occurs, the router gleans identifying information concerning the discovered IoT device, and transmits the gleaned information to the backend server. Such gleaning of identifying information can take the form of interrogating the discovered IoT device, and/or monitoring activities of the discovered device. The backend server can maintain a database of records concerning known IoT devices, with each record comprising at least a reputation score and a constraint profile. When the backend server receives identifying information concerning a discovered IoT device from a router, the backend server determines whether a record concerning the specific discovered IoT device is present in the database. If so, the constraint profile concerning the discovered device is transmitted to the router for enforcement. If not, the backend server can create a record concerning the discovered device containing a default constraint profile for unknown devices, and instruct the router accordingly. For example, the backend server can instruct the router to enforce a default constraint profile for unknown IoT devices for the discovered device on the local area network.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
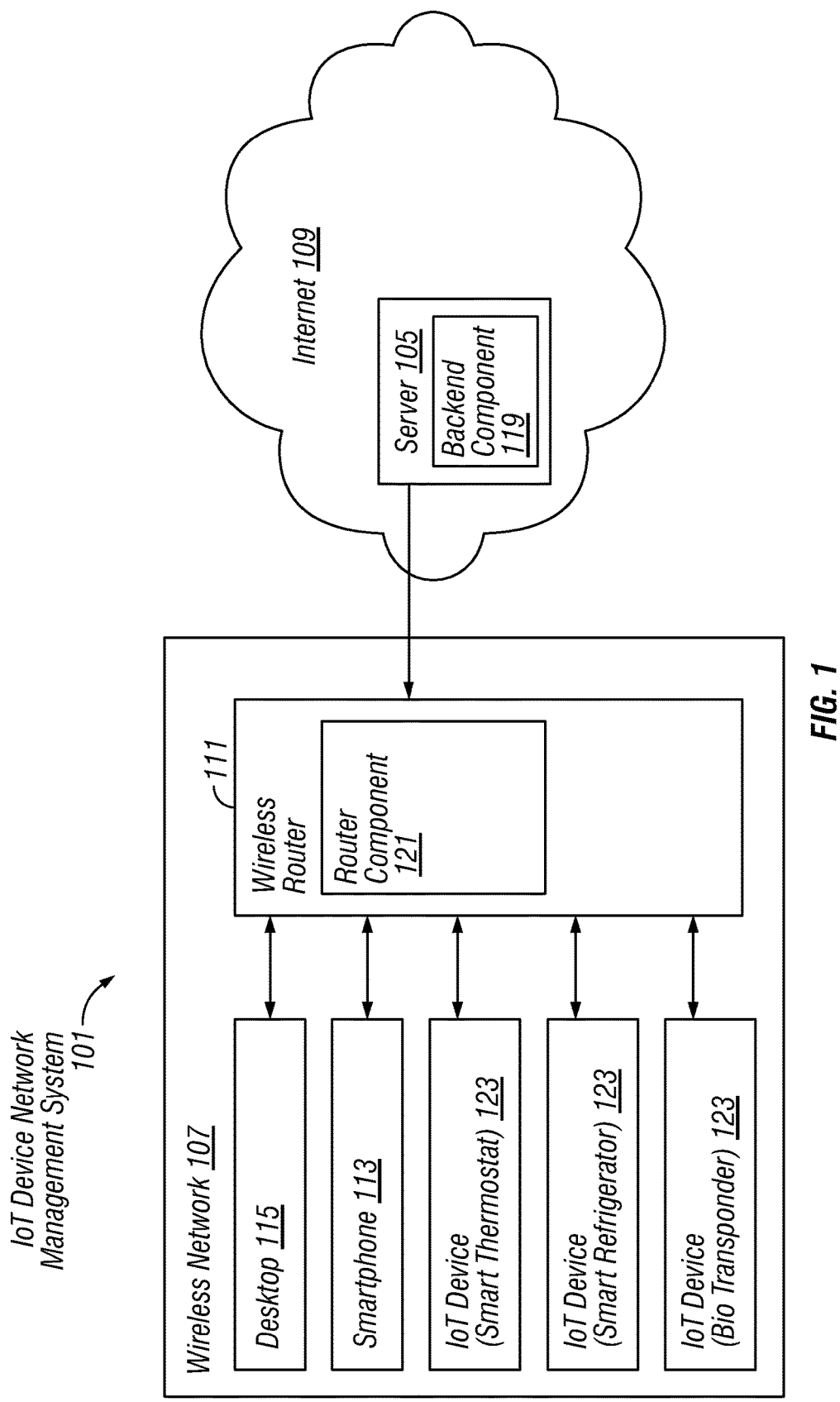
FIG. 1 is a block diagram of an exemplary network architecture in which an IoT device network management system can be implemented, according to some embodiments.

FIG. 1 is a block diagram illustrating an exemplary network architecture in which an IoT device network management system 101 can be implemented. The illustrated network architecture comprises a local area network 107 (for example in a home, school, coffee shop or other context). The illustrated local area network 107 comprises multiple computers 210 which are connected to a router 111, which is in turn connected the Internet 109 (or in other embodiments to a different wide area network). The computers 210 present in a local area network 107 can comprise any combination of desktop computers 115, mobile computing devices 113 and or IoT devices 123, acting in the capacity of clients 103 and/or servers 105 as desired. A mobile computing device 113 can comprise any type of portable computer system 210 capable of connecting to a network 107 and running computer instructions. Some such mobile computing devices 113 are referred to as smartphones, although some mobile phones not so designated also have these capabilities. Tablet computers, laptop computers, hybrids, convertible laptops, smart watches, smart bracelets, other types of wearable computing devices, smart stickers and smart tiles are all examples of mobile computing devices 113. An IoT device 123 can comprise any type of physical object containing a computing infrastructure capable of running computer instructions, connecting to a network 107 and automatically transferring data to other computing devices without requiring human-to-human or human-to-computer interaction. An example type of IoT device 123 is smart thermostats, washing machines, dryers, refrigerators and other appliances that use sensors to monitor conditions, positions, contents and/or other criteria, and responsively execute computer instructions to control their associated hardware (e.g., adjust temperature, speed, water flow, lighting, etc.), and/or transmit data to other computing devices over the network 107. Another example type is IoT devices 123 embedded within or worn by people or animals that perform automatic sensing, hardware control and/or data exchange functions (e.g., a pacemaker monitor and control implant, a transponder embedded in a farm animal or pet, a bracelet that monitors a person's heart rate, blood pressure, sleep hygiene, movements, etc.). Another example type is sensors/control units built into automobiles or other vehicles. A conventional general purpose computer such as a desktop, workstation, laptop, tablet or smart phone is typically not considered an IoT device 123. However, some contemporary mobile computing devices 113 can also be considered IoT devices 123, such as smart stickers, smart tiles, smart bracelets and other types of attachable/affixable/wearable computing devices.

In FIG. 1, the wireless local area network 107 comprises a router 111, a desktop computer 115, one mobile computing device (a smartphone) 113, and three IoT devices (a smart thermostat, a smart refrigerator, and a bio transponder embedded under the skin of, e.g., a family cat). Although in this context these devices are typically connected to the router 111 wirelessly, it is also possible for computing devices 210 in the local area network 107 to be physically coupled to the router 111, via, e.g., Ethernet. The router 111 is in turn communicatively coupled to the Internet 109 via cable, DSL through an ISP, optical fiber, etc. In practice, more or fewer computing devices 210 can be included in a local area network 107 as desired, and devices can be added to and removed from the network 107 over time, as well as come in and out of wireless range.

In FIG. 1, a router component 121 of an IoT device network management system 101 is illustrated as residing on a wireless router 111, and a backend component 119 residing on a server 105 on the Internet 109. It is to be understood that this is an example only, and in different embodiments various functionalities of the components of the IoT device network management system 101 can be instantiated on other types of computers 210 and/or programmable network appliances, and can be otherwise distributed between multiple computing devices as desired.

Figure 2:
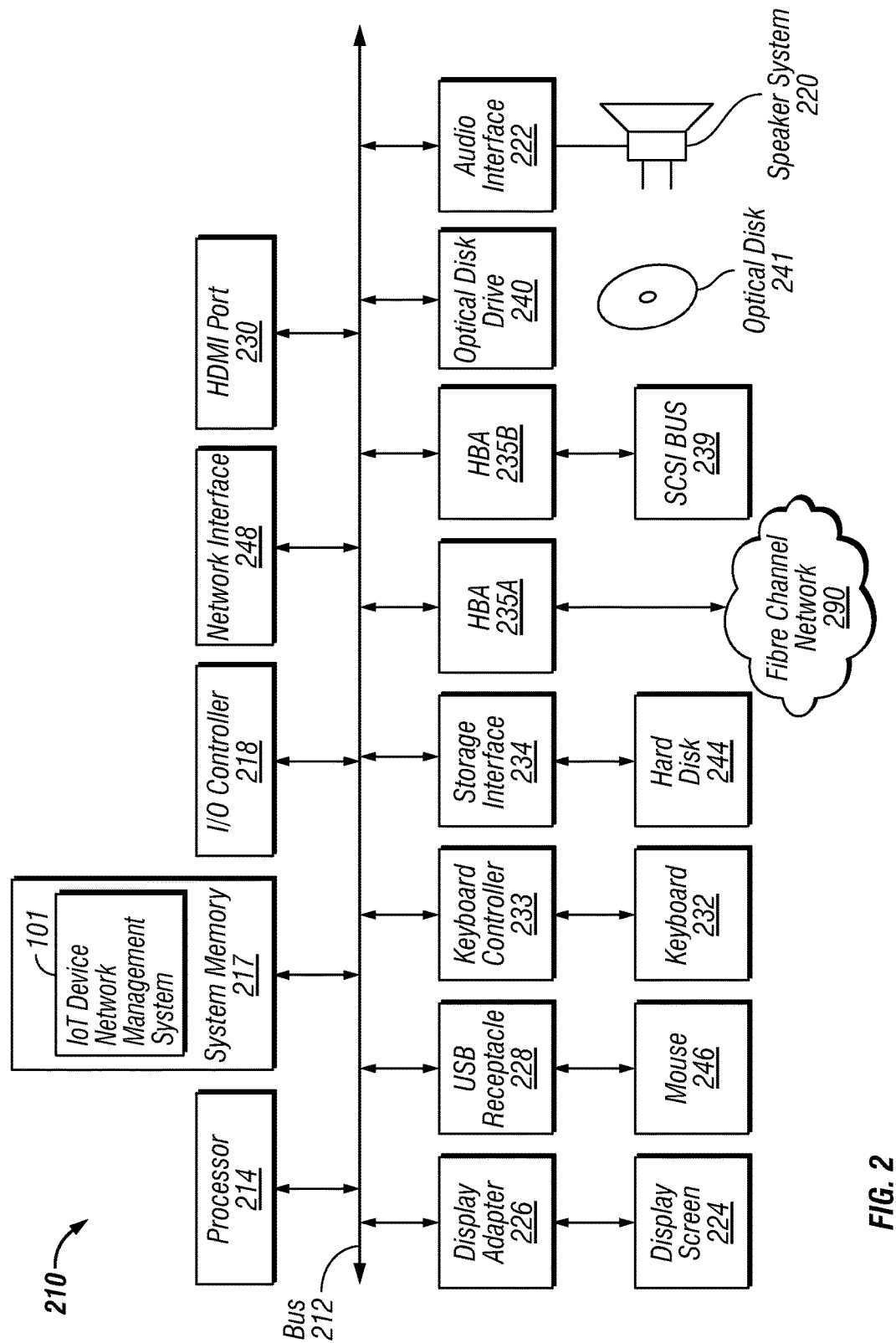
FIG. 2 is a block diagram of a computer system suitable for implementing an IoT device network management system, according to some embodiments.

FIG. 2 is a block diagram of a computer system 210 suitable for implementing an IoT device network management system 101. Both desktops 115 and mobile computing devices 113 can be implemented in the form of such computer systems 210. IoT devices 123 can also be implemented in the form of such computer systems 210, although typically lacking many of the illustrated components, such as optical disk drives 240, keyboards 242, pointing devices 246 and display screens 224.

As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, HDMI ports 230, etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 241, a mouse 246 (or other pointing device) coupled to the bus 212, e.g., via a USB receptacle 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 113 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the IoT device network management system 101 is illustrated as residing in system memory 217. The workings of the IoT device network management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the Internet 109. Mobile computing devices 113 can typically connect to wireless networks using the IEEE 802.11 standards (WiFi), and often have adapters for additional wireless communication protocols such as LTE, BlueTooth, NFC, etc. Smartphones are also typically equipped for voice communication over cellular networks.

Figure 3:
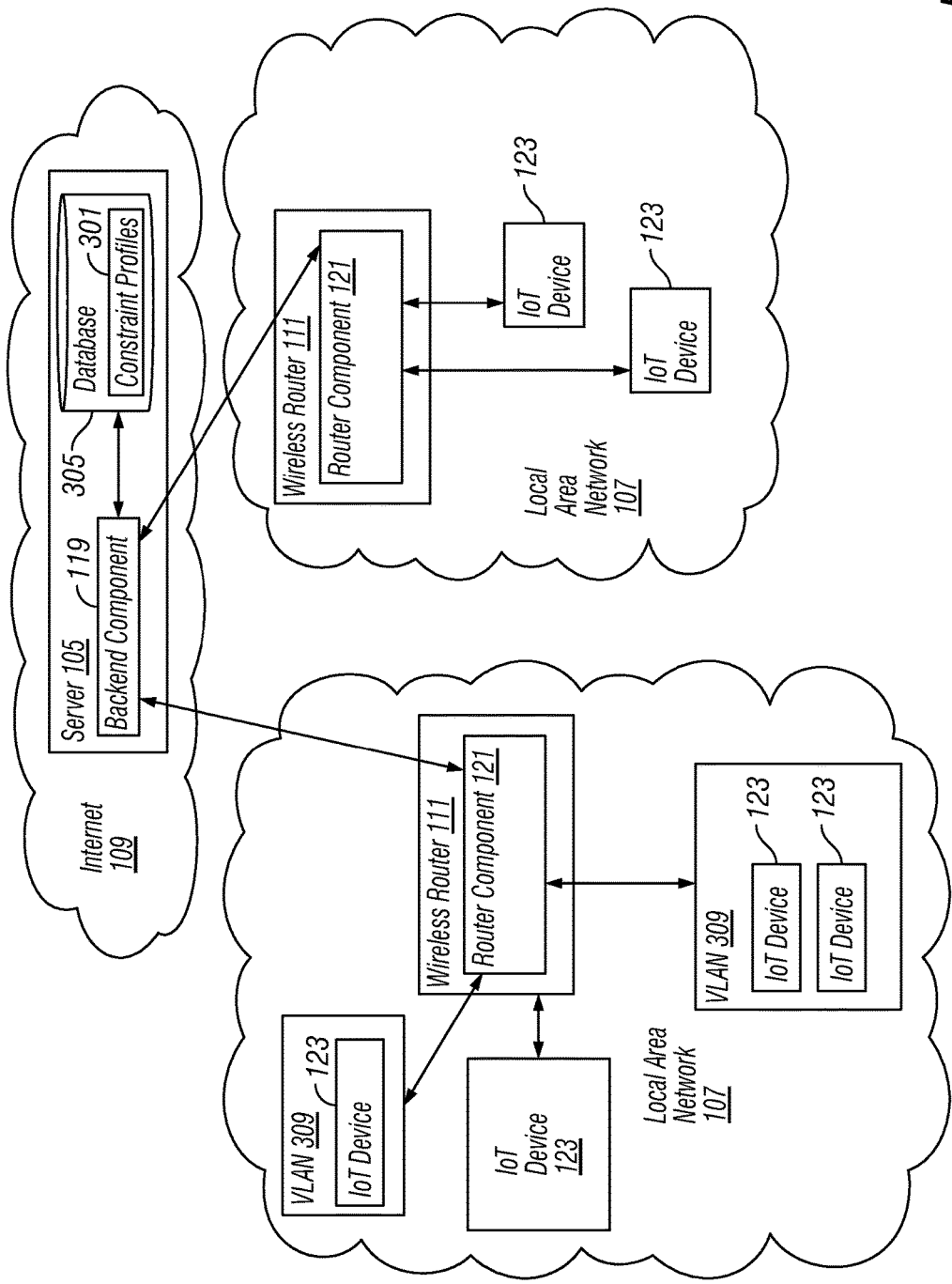
FIG. 3 is a block diagram of the operation of an IoT device network management system, according to some embodiments.

FIG. 3 illustrates a router component 121 of an IoT device network management system 101 running on the router 111 of each of multiple wireless local area networks 107. The router component 121 (i.e., the router level functionality of the IoT device network management system 101) can be instantiated as an application running on a hardware router 111 with a configurable software component. One possible example is DD-WRT aftermarket open source routing firmware (not illustrated), which can run on top of a hardware router 111, and be configured to provide the described functionality. In other embodiments, other implementations are used to build a configurable layer of functionality that runs in conjunction with the hardware and/or software level routing components.

Routers 111 tend to be powered on 24/7, making a router 111 a suitable location for certain functions performed by the IoT device network management system 101. In other embodiments the router level functionality of the IoT device network management system 101 is located on other components, such as a server computer 105 that is communicatively coupled to the router 111. In addition, as described in more detail below, a backend component 119 of the IoT device network management system 101 runs in the cloud (e.g., on one or more Internet servers 105), and communicates with router components 121 running on the routers 111 of multiple local area networks 107.

As noted above, the functionalities of the router components 121 and backend component 119 of the IoT device network management system 101 can be implemented on other computing devices, or can be distributed between multiple computer systems 210, including within a cloud-based computing environment in which the functionality of the IoT device network management system 101 is provided as a service over a network 107. It is to be understood that although the router components 121 and backend component 119 are illustrated in FIG. 3 as standalone entities, each component of the IoT device network management system 101 represents a collection of functionalities, which can be instantiated as a single or as multiple modules on one or more computing devices 210 as desired. FIG. 3 illustrates a specific embodiment in which the IoT device network management system 101 is instantiated in the form of specific, multiple modules which are located on routers 111 and a backend server 105. In other embodiments, the functionalities of the IoT device network management system 101 are distributed and/or instantiated in other ways.

The modules of the IoT device network management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the IoT device network management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

In addition to the IoT device network management system 101 functionality described below, each router 111 also typically supports a conventional local area network, to which conventional computing devices 210 can connect, using whatever conventional protocols the router 111 provides. Computing devices 210 can thus access the local area network and/or Internet according to the administered configuration. In some embodiments, routers 111 contain wireless transceivers (not illustrated) for communicating to IoT devices 123 using protocols such as Z-Wave, Zigbee, Bluetooth Low Energy, 6lowpan, etc. Under some such protocols, IoT devices 123 use a mesh network to communicate with one another and a hub that communicates with all of them and presents them to the network 107 as IP devices (the hub translates between IP and these other protocols). In some embodiments, the router 111 acts as such a hub. In some embodiments, the router 111 communicates with other such hubs as well (or instead). In addition, the router component 121 itself can use the connectivity provided by the router 111 to communicate with components outside of the local area network 107, such as the backend component 119 on the Internet 109.

The IoT device network management system 101 can be instantiated across multiple local area networks 107, and can be used to track and manage a large number of instances and a wide variety of IoT devices 123 deployed across a geographically diverse user base. Although FIG. 3 only depicts two local area networks 107 with router components 121 for clarity of illustration, it is to be understood that in practice the centralized backend component 119 of the IoT device network management system 101 can communicate with orders of magnitude more router components 121 (e.g., hundreds, thousands, tens of thousands, etc.), depending on the size of the installed customer base.

As described in more detail below, the IoT device network management system 101 protects against threats to and from IoT devices 123 by detecting their presence, monitoring their communication and other behaviors, establishing device reputations, and safely constraining the devices 123 to a minimum profile 301 for performing their legitimate functions. The router component 121 of the IoT device network management system 101 identifies and monitors IoT devices 123 at the local area network 107 level, and reports resulting gleaned information to the backend component 119. Thus, the backend component 119 receives information concerning the identification and behavior of various IoT devices 123 as they are installed and run on many different local area networks 107. The backend component 119 is therefore able to track the installations, communications and other behaviors of different IoT devices 123 on different local area networks 107 over time. In addition, the backend component 119 dynamically determines the reputations of the different IoT devices 123. Based on these factors, the backend component 119 creates constraint profiles 301 governing the allowed communication and behaviors of the different IoT devices 123, and provides these profiles 301 to the router components 121. The router components 121 enforce the received profiles 301, thereby automatically constraining the communications and behaviors allowed for different IoT devices 123, to minimize possible threats to or from the IoT devices 123 themselves, as well other computing devices, services and data on the local area networks 107. The constraint profiles 301 are geared towards allowing IoT devices 123 to perform expected, trusted operations in order to function as intended, while restricting the devices 123 from performing operations beyond this, at least until a device 123 reaches a requisite trust threshold. In some instances, IoT devices 123 can be constrained in their operations by being isolated in virtual local area networks (VLANS) 309.

Over time, the plurality of router components 121 across the user base continues to provide information to the backend component 119 concerning the detection and monitoring of IoT devices 123. The backend component 119 amalgamates the information it receives from the router components 121 (and in some instances from other sources as well, such as IoT device 123 manufacturers). Based on observed behaviors across installs on multiple local area networks 107, as well as backend analysis, the backend component 119 can optimize communication constraint profiles 301 as an IoT device's reputation and behaviors become better known. The backend component 119 dynamically updates reputations and constraint profiles 301 over time, and provides updated constraint profiles 310 to the router components 121.

For example, a constraint profile 301 for an unknown IoT device 123 can direct the router component 123 to segregate the given device 123 to a separate VLAN 309, monitor all attempts by the IoT device 123 to communicate with other devices, and probe the IoT device 123 for vulnerabilities. Over time as the IoT device 123 becomes known and specific communications it executes are deemed legitimate, the constraint profile 301 can be updated for running the IoT device 123 in a less restrictive VLAN 309 in which the expected communications are allowed, but the router component 121 continues to monitor the device for and inform the backend component 119 of any unexpected behaviors. This can all be done automatically, in a manner that is transparent to and requires no input from the user.

Describing these operations in more detail, a device discovering module of each router component 121 of the IoT device network management system 101 discovers IoT devices 123 on its local area network 107. Every time a new IoT device 123 is added to a given local area network 107, the corresponding device discovering module gleans identifying information concerning the new device 123. This can take the form of interrogating the device 123, or monitoring the communication or other activities of the device 123, and gleaning relevant device information from various protocols such as Address Resolution Protocol (ARP), Dynamic Host Configuration Protocol (DHCP), Universal Plug and Play (UPnP), Hypertext Transfer Protocol (HTTP), etc. The device discovering module transmits the gleaned identifying information concerning the device 123 to the backend component 119 of the of the IoT device network management system 101.

A database maintaining module of the backend component 119 of the of the IoT device network management system 101 maintains a database 305 (or other suitable storage mechanism) of records (or other suitable data structure) concerning known IoT devices 123, with corresponding reputation scores and constraint profiles 301. The configuration, adjustment and usage of reputation scores and constraint profiles 301 is described in more detail below. In any case, in response to receiving gleaned identifying device information from a router component 121, the database maintaining module determines whether there is a corresponding record concerning the device 123 in the database 305. If so, the database maintaining module transmits the associated constraint profile 301 to the router component 121, which can enforce the constraint profile 301 for the device 123 as described in detail below. Where the device 123 has not been previously identified, the database maintaining module creates a new database record based on the received device information, and typically associates a default constraint profile 301 for an unknown device 123 with the new record. This default constraint profile 301 can then be provided to the router component 121. In some embodiments, the router component 121 maintains the default constraint profile 301 for unknown devices 123. In this scenario, the backend component 119 transmits an indication to the router component 121 that the device 123 is unknown, and to utilize the default unknown device profile 301.

In one embodiment, the default constraint profile 301 for an unknown device 123 indicates to isolate the device 123 in a separate VLAN 309, monitor its communications and other behaviors, and report all monitored information to the backend component 119. It is to be understood that the specific constraints dictated in default profiles 301 for unknown devices 123 (or other device statuses) is a variable design parameter. Concerning unknown devices 123, the backend component 119 may be able to establish a higher reputation score for the device 123 over time that meets a threshold meriting a modified constraint profile 301 which lifts some of the functional constraints imposed on the device 123. As described in detail below, constraint profiles 301 associated with different devices 123 are dynamic, and are based on what is known about the expected functionality to be performed by device 123, as well as the reputation score of the device 123. IoT devices 123 discovered on local area networks 107 can range, for example, from a first detected instance of an entirely unknown device 123, to a device 123 that is rapidly becoming more commonly deployed and has an identified set of expected behaviors and a midlevel reputation score, to a very well known device 123 from a highly trusted manufacturer, with anything in between and at any level of granularity. Devices 123 can also be known or suspected of being malicious, and benign devices 123 from legitimate manufacturers can still have specific known or suspected vulnerabilities.

In order to provide the backend component 119 with current information concerning IoT devices 123, each router component 121 contains a monitoring module which monitors the attempted communications and other activities of discovered devices 123, and transmits the resulting information to the backend component 119. The specific information tracked and provided to the backend can vary between embodiments, but can include information such as sources and targets of communication requests, content of attempted communications, ports utilized, attempts to access specific resources on other network devices, etc. Thus, between the information provided by the discovering modules and monitoring modules of the multiple router components 121, the backend component 119 is continuously receiving current information concerning which devices 123 are detected on the local area networks 107 of the install base, as well as monitored communication activity and other behaviors of the devices 123.

An amalgamating module of the backend component 119 amalgamates information concerning devices 123 it receives from the multiple router components 121, storing the amalgamated data in the database 305, for example, or another suitable storage component. This amalgamated data (as well as information from other sources as described in more detail below) is used by a reputation score calculating module of the backend component 119 to calculate dynamic reputation scores of devices 123. As used herein, a reputation score means a quantified value indicative of the trustworthiness of a device 123, based on a variety of dynamic factors. Some examples of such factors used in some embodiments are the length of time the device 123 has been in use (e.g., length of time in the market), the number of users in the field who have installed the device 123, the manufacturer of the device 123 (e.g., how long they've been around, the track record of their other devices 123, etc.), the device's market share, reviews of the device 123 (e.g., by users, by the media, on blogs, etc.), domains with which the device 123 communicates and their geolocations, detected or reported security vulnerabilities of the device 123 or the lack thereof, etc. It is to be understood that a device's reputation score is dynamic, and can be adjusted up and down as more information about the device 123 is gleaned and received from the many router components 121 installed in the field, as well as other sources including backend analysis as described below. For example, the reputation score of a popular but new device 123 can improve as time passes, the install base increases and no problems arise. On the other hand, the reputation score of another device 123 could decrease in response to a known stable device 123 suddenly beginning to gather personal information from local area networks 107 and transmitting the gathered personal information to an unknown domain in a geolocation associated with malicious activity. Reputation scores can indicate levels of trustworthiness ranging from known malicious, to suspected malicious, to unknown, to suspected benign, to known benign, at any level of granularity (e.g., a numerical score between 0 and 100). The specific format of the reputation score is a variable design parameter.

In addition to calculating reputation scores, an activity tracking module of the backend component 119 tracks activities different devices 123 perform in order to execute their authorized functionality, based on the amalgamated information and other sources (e.g., backend analysis which is described in greater detail below). These actions can be thought of as expected activities for a device 123. Expected activity for a device 123 indicates what behaviors the device 123 is known to execute in order to perform its authorized functionality. This can include factors such as domains with which the device communicates, protocols used, ports used, the direction, content and format of known legitimate communications, etc. This information can be tracked per device 123 at any level of granularity. For example, a known smart thermostat device could be expected to, e.g., transmit data to and receive data from specific domains (e.g., that of its own manufacturer and google.com), only on ports 9543, 11095, 80, and 443, but not to communicate with any other domains on any other ports, and not to directly communicate with other devices 123 on the local area network 107.

Based on the reputation score of a given device 123, as well as what is known about the expected communication and other activity for the device 123, a constraint profile creating module of the backend component 119 creates and dynamically maintains a constraint profile 301 for the device 123, and provides the constraint profile 301 to the various router components 121 of the install base. As noted above, a new device 123 with no established reputation score would typically be assigned a highly restricted default constraint profile 301. For example, the profile 301 could indicate to isolate the device 123 in restricted VLAN 309, not let the device 123 access any computers 210 on the local area network 107, monitor all of its attempted activity, and perform a variety of tests to check it for vulnerabilities. Devices 123 with reputation scores meeting given thresholds can be allowed successively greater levels of access based on their expected activity, and/or be placed in different VLANS 309. As described below, once a device 123 obtains a requisite reputation score, it can be provided with a new constraint profile 301 indicating a higher level of confidence. The specific constraints and allowed actions specified in different constraint profiles 301 varies between embodiments as desired.

A constraint profile enforcing module of the router component 123 enforces the constraint profile 301 received for a given device 123. As noted above, the constraint profile 301 can be at any level of granularity as desired. In some embodiments, constraint profiles 301 specify to place devices 123 with differing levels of reputation score and/or expected behaviors in different corresponding VLANS 309 on local area networks 107. The specific reputation score thresholds to be met to be assigned to a given VLAN 309 (or other constraint profile based level of network restriction/access) is a variable design parameter. In such embodiments, the constraint profile enforcing module enforces what can be thought of as reputation score-based zoning of devices 123. To do so, the constraint profile enforcing module creates multiple VLANS 309 (zones) with varying levels of access and privileges. Devices 123 with reputation scores below a given threshold are put in the zone with lowest privilege level, and devices 123 with successively higher reputation scores are placed in zones with more access based on successive thresholds. The number of zones and the corresponding reputation score threshold levels are variable design parameters.

In other embodiments, constraint profiles 301 can be more narrowly tailored to specific devices 123, with a target of enabling the device 123 to perform its expected communications and other behaviors in order to execute its authorized functionality, but at the same time to isolate the device 123 from other components on the local area network 107, and protect the device 123 itself as well as the rest of the local area network 107 from any potential vulnerabilities introduced by the device 123. The constraint profile enforcing module can use the specifications in the constraint profile 301 to configure firewall and network topology for the device 123 to function both fully and safely. For example, the constraint profile enforcing module can put a given device 123 on a dedicated VLAN 309 separate from the general local area network 107, with specific firewall rules that expressly limit its communications only to the appropriate known legitimate domains, ports, direction of communication or even communication content.

Over time, as the backend component gleans updated information concerning a given device 123 (e.g., as more instances of the device 123 have been deployed in the field for longer periods, and more empirical data is gathered), the rating score, expected behaviors and corresponding constraint profiles 301 can be updated. How often to update these factors can vary between embodiments and under different circumstances as desired. It is to be understood that changes in reputation score and constraint profile 301 based on new information can be in either direction. In other words, a new unknown device 123 can obtain a higher reputation score and thus less constraint when, for example, the device 123 becomes well known and more trusted. On the other hand, a trusted device can lose that status if, for example, the device 123 is detected behaving in risky or malicious ways. In any case, updated constraint profiles 301 are transmitted to router components 121, which utilize them to update their management of the corresponding devices 123. Note that in some embodiments, different versions of the same device 123 are treated differently. In other words, an earlier version of a given IoT device 123 (e.g., with firmware that has vulnerabilities) is treated differently than the next version of the same device 123 (e.g., with updated firmware that fixes the vulnerabilities (or adds new ones)).

In different embodiments, the monitoring module can vary the extent and specifics of its monitoring of different devices 123, as directed by the constraint profiles 301 according to reputation score. For example, the default constraint profile 301 for newly discovered, unknown devices 123 (and/or constraint profiles 301 for, e.g., all devices 123 with reputation scores below a given requisite threshold) can indicate to run the device 123 in a "full monitor" mode. In such a mode, the device 123 is isolated and all of its attempted activities are closely monitored, so that any attempted suspicious activities can be detected and blocked or otherwise managed. In some embodiments, such devices 123 are contained in a simulated testing environment. The types of actions that are considered suspicious vary between embodiments, but can include attempts to access specific (or any) other devices 123, data or resources on the local area network 107, attempts to communicate with malicious, suspicious or unknown domains, or domains in suspicious geolocations, etc. The nature and reputation of any cloud service with which the device 123 attempts to communicate can also be examined and evaluated. In addition, the content of attempted communications by the device 123 can be monitored, to detect any attempted transfer of suspicious, sensitive, or personal/private information. Devices 123 with successively higher reputations can be monitored less extensively at any level of granularity as desired.

Constraint profiles 301 can be configured such that when a device 123 (including, in some embodiments a device 123 with a high (or any) reputation score) attempts to execute an action that is outside of its expected behaviors, the router component 119 monitors the action (which can include isolating the device and running it in a testing zone) and evaluates whether the attempted action is suspicious, malicious or an indication of a new but legitimate functionality. For example, when a device 123 with a high reputation score (e.g., above a given threshold) attempts to execute an action that violates its constraint profile 301, it is possible that the device 123 (or its corresponding cloud service) has been compromised. On the other hand, the device 123 could have been updated with a new, perfectly legitimate behavior. Thus, attempted violations of constraint profiles 301, including those by devices 123 with high reputation scores, can be monitored, and the monitored information transmitted to the backend component 119 and amalgamated, such that it is used to update the constraint profile 301 and the reputation score of the device 123 as described above.

In some embodiments, a vulnerability testing module of the router component 121 tests devices 123 (e.g., newly discovered devices 123, devices 123 with reputation scores below a given threshold, etc.) for various security vulnerabilities (e.g., does the device 123 enumerate valid user accounts, can an outsider get root access, etc.). This testing can further include testing the device 123 for infection by malicious code (e.g., signature based scanning, heuristic analysis, etc.). Cloud services the device 123 utilizes (as well as the protocols with which the device 123 conducts such communication) can also be tested for vulnerabilities (e.g., cloud service vulnerable to cross site scripting or denial of service attacks, cloud service and device exchange unencrypted personal information to cloud site, etc.). What specific vulnerability testing to perform is a variable design parameter. In some embodiments, vulnerability testing can also be performed by the backend component 119. In some instances, human analysts can also participate in backend vulnerability testing of device 123, and the results can be input into the backend component 119.

Detected vulnerabilities in otherwise legitimate devices 123 can be addressed at a constraint profile 301 level. It is to be understood that known devices 123 from legitimate manufacturers can be determined to have security vulnerabilities. In these cases, the corresponding constraint profiles 301 can be configured to protect against the exploitation of the vulnerabilities. Depending on the type and severity of the vulnerability, a given device 123 may simply have its access restricted so as to patch the security threat. In response to other vulnerabilities, a device 123 can be quarantined until it can be patched. In extreme cases it may even be that a device 123 is infected with malicious code (or is explicitly malicious), and in these cases such devices 123 can be denied all access. Detected vulnerabilities can be reported to the device's manufacturer where desired.

In some embodiments, device manufacturers can submit new devices 123 to the vendor of the IoT device network management system 101 for pre-certification. During the pre-certification process, the device 123 (and any cloud services or apps it utilizes) can be tested for vulnerabilities (programmatically and/or by human analysts as desired) before the device is released in the market. This way, any detected vulnerabilities or concerns could be reported to the manufacturer and corrected prior to the market release of the device 123. Such pre-certified devices 123 would thus already be known to the IoT device network management system 101 and have corresponding high reputation scores and not-overly restrictive constraint profiles 301 from the very first time they are seen by a router component 121 in the field.

Additionally, new devices 123 (e.g., those from well-known manufacturers with good track records) can be prioritized for accelerated constraint profile 301 creation (e.g., in a testing environment). For example, if it is detected that a new device 123 from a known manufacturer is becoming popular, the device 123 can be proactively analyzed for vulnerabilities (programmatically and/or by human analysts) in order to fast track the creation of an accurate corresponding constraint profile 301, rather than waiting for a sufficient amount of data to be captured in the field and amalgamated.

Typically, users (e.g., local area network level administrators) can edit constraint profiles 301 and/or move devices 123 across different zones (or subnets), for example by operating a graphical or other type of user interface.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A method implemented on a backend server computer for securing internet of things (IoT) devices on a plurality of local area networks, each one of the plurality of the local area networks comprising a router and multiple computing devices, the method comprising:
   receiving, by the backend server computer from the routers of the multiple ones of the plurality of local area networks, information concerning monitored activities of multiple IoT devices on the multiple ones of the plurality of local area networks;
   amalgamating, by the backend server computer, information concerning monitored activities of multiple IoT devices received from the routers of the multiple ones of the plurality of local area networks over time;
   calculating, by the backend server computer for each specific IoT device for which information concerning monitored activities is received, a dynamic reputation score quantifying trustworthiness of the specific IoT device, based on at least amalgamated information concerning monitored activities of the specific IoT device;
   determining, by the backend server computer for each specific IoT device for which information concerning monitored activities is received, activities the specific IoT device performs in order to execute authorized functionality, based on at least amalgamated information concerning monitored activities of the specific IoT device;
   creating a constraint profile for each specific IoT device for which information concerning monitored activities is received, based on at least a corresponding reputation score and corresponding determined activities, by the backend server computer, each constraint profile comprising local area network level directives specifying how to enable the corresponding IoT device to execute authorized functionality while maintaining local area network level security;
   wherein creatine a constraint profile for a specific IoT device based on at least a corresponding reputation score and corresponding determined activities further comprises:
      testing the specific IoT device for security vulnerabilities; and
      configuring the constraint profile to protect against at least one discovered security vulnerability; and
   transmitting the created constraint profiles to the routers of the plurality of local area networks, by the backend server computer.

2. The method of claim 1 further comprising:
   periodically calculating updated reputation scores concerning specific IoT devices by the backend server computer, based on at least additional information concerning monitored activities of multiple IoT devices, subsequently received from routers of multiple ones of the plurality of local area networks;
   periodically updating, by the backend server computer, determined activities which specific IoT devices perform in order to execute their authorized functionality, based on at least additional information concerning monitored activities of multiple IoT devices, subsequently received from routers of multiple ones of the plurality of local area networks;
   periodically updating constraint profiles for specific IoT devices by the backend server, based on corresponding updated reputation scores and updated determined activities; and
   transmitting by the backend server computer, updated constraint profiles to the routers of the plurality of local area networks.

3. The method of claim 1 further comprising:
   maintaining, by the backend server computer, a database of records concerning known IoT devices, each record comprising at least a reputation score and a constraint profile.

4. The method of claim 1 further comprising:
   receiving, by the backend server computer from routers of multiple ones of the plurality of local area networks, identifying information concerning IoT devices discovered by the routers on the multiple ones of the plurality of local area networks; and
   in response to receiving identifying information concerning a specific IoT device discovered by a specific router on a specific local area network, determining whether a record concerning the specific discovered IoT device is present in the database.

5. The method of claim 4 further comprising:
   in response to determining that a record concerning the specific discovered device is present in the database, transmitting a constraint profile concerning the specific discovered device to the router component.

6. The method of claim 4 further comprising:
in response to determining that a record concerning the specific discovered device is not present in the database, creating a record concerning the specific discovered device in the database, the created record containing a default constraint profile for unknown devices, and instructing the specific router to enforce the default constraint profile for the specific discovered device on the specific local area network.

7. A method implemented on a router on a local area network for securing internet of things (IoT) devices, the method comprising:
monitoring activities of at least one IoT device on the local area network;
transmitting information concerning monitored activities of the at least one IoT device to a backend server computer that receives information concerning monitored activities of multiple IoT devices from multiple local area networks;
for the at least one IoT device on the local area network, receiving, from the backend server computer, a corresponding constraint profile comprising local area network level directives specifying how to enable the corresponding IoT device to execute authorized functionality while maintaining local area network level security;
wherein the constraint profile for the at least one specific IoT device was created by the backend server computer based on at least a corresponding reputation score and corresponding determined activities, and wherein creating the constraint profile for the at least one specific IoT device further comprises:
testing the specific IoT device for security vulnerabilities; and
configuring the constraint profile to protect against at least one discovered security vulnerability; and
for the at least one IoT device on the local area network, enforcing a corresponding constraint profile.

8. The method of claim 7 wherein enforcing a constraint profile further comprises:
creating a virtual local area network (VLAN) with restricted privileges on the local area network;
isolating an IoT device corresponding to the constraint profile being enforced in the created VLAN, such that the privileges of the IoT device are restricted.

9. The method of claim 7 wherein enforcing a constraint profile further comprises:
creating a plurality of VLANs with varying levels of restricted privileges on the local area network;
isolating specific ones of a plurality of IoT devices in specific ones of the plurality of created VLANs based on reputation scores concerning the specific IoT devices, such that the privileges of IoT devices with varying reputation scores are subject to varying levels of restriction.

10. The method of claim 7 wherein enforcing a constraint profile further comprises:
enforcing specific firewall rules for an IoT device corresponding to the constraint profile.

11. The method of claim 7 wherein enforcing a constraint profile further comprises:
limiting an IoT device's communication to specific domains and ports.

12. The method of claim 7 wherein enforcing a constraint profile further comprises:
limiting an IoT device's communication to specific content.

13. The method of claim 7 further comprising:
discovering an IoT device on the local area network;
gleaning identifying information concerning the discovered IoT device;
transmitting gleaned identifying information concerning the discovered IoT device to the backend server computer;
receiving a constraint profile concerning the discovered IoT device from the backend server computer; and
enforcing the received constraint profile on the local area network for the discovered device.

14. The method of claim 13 wherein enforcing the received constraint profile on the local area network for the discovered device further comprises:
responsive to instructions received from the backend server computer, enforcing a default constraint profile for unknown IoT devices for the discovered device on the local area network.

15. The method of claim 13 wherein gleaning identifying information concerning the discovered IoT device further comprises:
interrogating the discovered IoT device.

16. The method of claim 13 wherein gleaning identifying information concerning the discovered IoT device further comprises:
monitoring activities of the discovered device; and
gleaning identifying information from the monitored activities.

17. The method of claim 7 further comprising:
periodically receiving updated constraint profiles concerning specific IoT devices from the backend server computer; and
enforcing received updated constraint profiles for specific IoT devices on the local area network.

18. The method of claim 7 further comprising:
testing an IoT device on the local area network for security vulnerabilities; and
transmitting information concerning at least one discovered security vulnerability to the backend server computer.

19. A method implemented on a router on a local area network for securing internet of things (IoT) devices, the At least one non-transitory computer readable medium for securing internet of things (IoT) devices on a plurality of local area networks, by a backend server computer, each one of the plurality of the local area networks comprising a router and multiple computing devices, the at least one non-transitory computer readable medium storing computer executable instructions that, when loaded into computer memory and executed by at least one processor of at least one computing device, cause the at least one computing device to perform the following steps:
receiving, by the backend server computer from the routers of the multiple ones of the plurality of local area networks, information concerning monitored activities of multiple IoT devices on the multiple ones of the plurality of local area networks;
amalgamating, by the backend server computer, information concerning monitored activities of multiple IoT devices received from the routers of the multiple ones of the plurality of local area networks over time;
calculating, by the backend server computer for each specific IoT device for which information concerning monitored activities is received, a dynamic reputation score quantifying trustworthiness of the specific IoT device, based on at least amalgamated information concerning monitored activities of the specific IoT device;

determining, by the backend server computer for each specific IoT device for which information concerning monitored activities is received, activities the specific IoT device performs in order to execute authorized functionality, based on at least amalgamated information concerning monitored activities of the specific IoT device;

creating a constraint profile for each specific IoT device for which information concerning monitored activities is received, based on at least a corresponding reputation score and corresponding determined activities, by the backend server computer, each constraint profile comprising local area network level directives specifying how to enable the corresponding IoT device to execute authorized functionality while maintaining local area network level security;

wherein creating a constraint profile for a specific IoT device based on at least a corresponding reputation score and corresponding determined activities further comprises:
    testing the specific IoT device for security vulnerabilities; and
    configuring the constraint profile to protect against at least one discovered security vulnerability; and transmitting the created constraint profiles to the routers of the plurality of local area networks, by the backend server computer.

* * * * *